United States Patent

[11] 3,624,150

| [72] | Inventors | Johann Albrecht Renner<br>Leverkusen;<br>Ludwig Eue, Cologne-Stammheim;<br>Helmuth Hack, Cologne-Buchheim, all of Germany |
|---|---|---|
| [21] | Appl. No. | 801,823 |
| [22] | Filed | Feb. 24, 1969 |
| [45] | Patented | Nov. 30, 1971 |
| [73] | Assignee | Farbenfabriken Bayer Aktiengesellschaft<br>Leverkusen, Germany |
| [32] | Priority | Mar. 1, 1968 |
| [33] | | Germany |
| [31] | | P 16 68 104.2 |

[54] POLYHALO-(SULFONIC ACID ANILIDES)
4 Claims, No Drawings

[52] U.S. Cl. .................................................... 260/556 AR,
71/103, 260/578
[51] Int. Cl. ...................................................... C07c 143/78

[50] Field of Search ........................................... 260/556
AR

[56] References Cited
UNITED STATES PATENTS

| 1,915,334 | 6/1933 | Salzberg et al. ............... | 260/243 |
|---|---|---|---|
| 2,075,359 | 3/1937 | Salzberg et al. ............... | 424/250 |
| 2,937,202 | 5/1960 | Slagh et al. .................... | 260/556 A |

*Primary Examiner*—Henry R. Jiles
*Assistant Examiner*—S. D. Winters
*Attorney*—Burgess, Dinklage & Sprung

ABSTRACT: Polyhalo-(sulfonic acid anilides), i.e. 2,4- and 3,4-dichloro-benzene-sulfonic acid (2'-chloro or bromo- -3',5'-di- and 3',4',5'-tri--chloro)-anilides which possess strong herbicidal properties, especially with respect to submersed aquatic plants, and which may be produced by conventional methods.

POLYHALO-(SULFONIC ACID ANILIDES)

The present invention relates to and has for its objects the provision for particular new polyhalo-(sulfonic acid anilides), i.e. 2,4- and 3,4-dichloro-benzene-sulfonic acid (2'-chloro or bromo- -3', 5'-di- and 3', 4',5'-tri- -chloro) -anilides which possess valuable selective herbicidal properties, especially with respect to submersed aquatic plants, active compositions in the form of mixtures of such compounds with solid and liquid dispersible carrier vehicles, and methods for producing such compounds and for using such compounds in a new way, especially for combatting and controlling submersed aquatic plants, and the like, with other and further objects becoming apparent from a study of the within specification and accompanying examples.

It is already known that chloro-phenyl-(sulfonic acid anilides) exhibit general herbicidal properties (compare U.S. Pat. No. 3,246,976). However, these substances are not known to be active against aquatic plants. Typical representatives of this group of compounds are for example 4-chloro-phenyl-2'-methyl-sulfonic acid anilide (A) and 4-chloro-phenyl-2'-chloro-sulfonic acid anilide (B).

It has now been found, in accordance with the present invention, that the particular new polyhalo-(sulfonic acid anilides) of the formula:

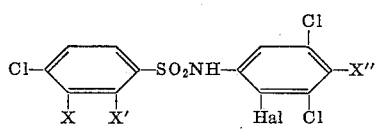

in which
X and X' are chloro or hydrogen, such that
X is chloro, when
X' is hydrogen,
whereas
X is hydrogen, when
X' is chloro,
and
X'' is chloro or hydrogen, and
Hal is chloro or bromo,
exhibit strong damaging or herbicidal properties with respect to submersed aquatic plants.

It has been furthermore found in accordance with the present invention, that a process for the production of polyhalo-(sulfonic acid anilides) of formula (I) above may be provided, which comprises reacting a sulfonic acid chloride of the formula:

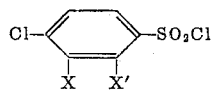

in which
X and X' are the same as defined above,
in the presence of an acid-binding agent and optionally in the presence of a solvent, with an aniline of the formula:

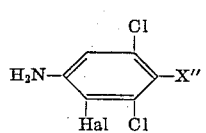

in which
X'' and Hal are the same as defined above.

It is decidedly surprising that the active compounds according to the present invention possess a substantially higher herbicidal activity against aquatic plants than the previously known and chemically very similar herbicidally active chlorophenyl-(sulfonic acid anilides). The instant active compounds therefore represent a valuable enrichment of the art.

The reaction course is illustrated by the following specific reaction mechanism:

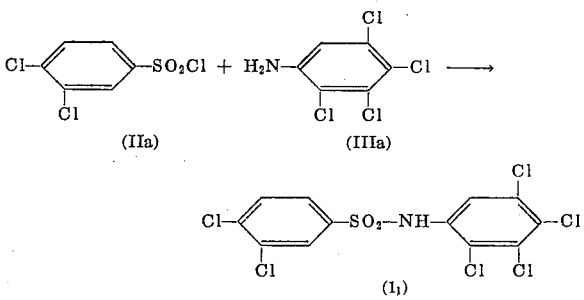

Advantageously, in accordance with the present invention in the various formulae herein:

X is chloro, X' is hydrogen, X'' is chloro and Hal is chloro; or

X is hydrogen, X' is chloro, X'' is chloro and Hal is chloro; or

X is chloro, X' is hydrogen, X'' is hydrogen and Hal is chloro; or

X is hydrogen, X' is chloro, X'' is hydrogen and Hal is chloro; or

X is chloro, X' is hydrogen, X'' is chloro and Hal is bromo; or

X is hydrogen, X' is chloro, X'' is chloro and Hal is bromo; or

X is chloro, X' is hydrogen, X'' is hydrogen and Hal is bromo; or

X is hydrogen, X' is chloro, X'' is hydrogen and Hal is bromo.

The sulfonic acid chlorides usable as starting materials are already known.

Some of the anilines usable as starting materials are also known. The new anilines can be prepared in simple manner according to the usual processes in the same way as the known anilines.

As solvents (the term solvents including mere diluents), inert organic solvents are suitable. These include preferably: hydrocarbons, such as benzene and xylene; chlorinated hydrocarbons, such as chlorobenzene; ethers, such as diethyl ether, dioxan and tetrahydrofuran; ketones, such as acetone and methylethyl ketone; and the like. However, an excess of the aniline reactant may also be used, or pyridine, if that is used as acid-binding agent.

As acid-binding agent, all customary acid-binding agents may be used. Preferably, tertiary amines, such as pyridine, quinoline, picolines, triethylamine, and the like, or an excess of the primary aniline used as reactant are employed. However, inorganic acid-binding agents such as sodium carbonate, potassium bicarbonate, sodium bicarbonate, and the like, may also be used.

The reaction temperatures can be varied within a fairly wide range. In general, the work is carried out at substantially between about −20° and +230° C., preferably at between about 0°–220° C.

When carrying out the production process, 1 mol of sulfonic acid chloride is used with at least 1 mol of aniline. When an excess of aniline is used as acid-binding agent, the addition of a solvent is usually dispensed with. The reaction itself and the working up of the reaction mixture are carried out in the usual manner.

Advantageously, the instant active compounds exhibit strong herbicidal activity in the case of aquatic plants, particularly in the case of submersed water plants. By aquatic plants are meant in the widest sense all plants which grow in water where they are not desired, irrespective of whether they are completely covered by water or project in part from the water.

As examples of typical aquatic plants, there are mentioned: Monocotyledoneae such as *Elodea densa, Najas quadalupensis, Potamogen* spec., *Lemna minor,* Spirodelia spec., *Vallisneria spiralis;* Dicotyledoneae such as *Ceratophyllum demersum, Myriophyllum brasiliensis;* and the like.

The active compounds according to the present invention are effective advantageously not only in static water but also in running water. Even a brief contact time is sufficient to damage the plant so greatly that such plant will die.

The active compounds according to the instant invention can be utilized, if desired, in the form of the usual formulations or compositions with conventional inert pesticidal diluents or extenders, i.e., conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g., conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons, (e.g. benzene, toluene, xylene, etc.), halogenated, especially chlorinated, aromatic hydrocarbons (e.g. chlorobenzenes), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e., calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as nonionic and/or anionic emulsifying agents (e.g., polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds according to the instant invention may be employed alone or in the form of mixtures with one another and/or with such solid and/or liquid dispersible carrier vehicles and/or with other known compatible active agents, especially plant protection agents, such as other herbicides, or fungicides, insecticides, bactericides, etc., including phenoxycarboxylic acids, triazines, ureas, quaternary pyridilium compounds, chlorinated fatty acids, aminotriazole, and the like, if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent and preferably 0.5–90 percent, by weight of the mixture, whereas carrier composition mixtures suitable for direct application or field application generally contemplate those in which the active compound is present in an amount substantially between about 0.0001–20 percent, preferably 0.0005–5 percent, by weight of the mixture. Thus, the present invention contemplates overall complications which comprise mixtures of a conventional dispersible carrier vehicle such as (1) a dispersible inert finely divided carrier solid, or (2) a dispersible carrier liquid such as an inert organic solvent and/or water preferably including a surface-active effective amount of a carrier vehicle assistant, e.g. as surface-active agent, such as an emulsifying agent and/or a dispersing agent, and an amount of the active compound which is effective for the purpose in question and which is generally between about 0.0001–95 percent, and preferably 0.0005–95 percent, by weight of the mixture.

In particular the present invention contemplates methods of selectively killing, combating or controlling submersed aquatic plants or weeds, and the like, which comprise applying to at least one of (a) such submersed aquatic plants and (b) their habitat, i.e. the vincinal water, e.g. the quiescent or running waters containing such submersed aquatic plants, a herbicidally effective or toxic amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, squirting, and the like.

In particular, the instant preparations are applied by spraying or squirting the preparations onto the water. The preparations preferably can, furthermore, be injected into the water or scattered onto the water in the form of granules.

Application takes place expediently when the plants have passed the seedling stage, but fully grown plants are also well controlled. Understandably, the amount of the particular active compound to be used is governed by the amount of water to be treated and, in the case of running or flowing water, also by the speed of flow of the water. The concentrations of the particular active compound, irrespective of the presence or absence of the carrier vehicle, may very within a fairly wide range and lie preferably about between 0.1 and 100 parts per million parts (mg./1) of water.

It will be realized, of course, that the concentration of the particular active compound utilized, alone or in admixture with the carrier vehicle, will depend upon the specific intended application. Therefore, in special cases, it is possible to go above or below the aforementioned concentration ranges.

The outstanding herbicidal effectiveness with respect to submersed aquatic plants or weeds of the particular active compounds according to the present invention, as well as their distinct superiority compared with known compounds of analogous constitution and the same type of activity, can be seen, by way of illustration and without limitation, from the following experimental test results:

Example 1

Aquatic plant test [static water]
Solvent: 10 parts by weight acetone
Emulsifier: 2 parts by weight alkylaryl polyglycol ether To produce a suitable preparation of the particular active compound, 1 part by weight of such active compound is mixed with the stated amount of solvent, the stated amount of emulsifier is then added, and the resulting concentrate is thereafter diluted with water to the desired final concentration.

Aquatic plants are planted in a large vessel filled with tap water and having the bottom thereof covered with soil.

The plants remain there untreated for about 3 weeks for acclimatization. The active compound preparation is then sprayed onto the surface of the water and the water is stirred. The concentration of the given active compound in the preparation is of no importance; only the amount of active compound per unit volume of water in the vessel is decisive.

After a specified period of time in the treated water, the degree of damage to the plants is evaluated, using the following characteristic values:

0 no damage
1 a few leaves dying
2 one third of the plant dead
3 one half of the plant dead
4 plants dying, but still green
4.5 only a few green parts left
5 plant completely dead.

The particular active compounds tested, their concentrations, the aquatic plants, the residence period and the degrees of damage can be seen from the following tables 1a and 1b.

TABLE 1a.—AQUATIC PLANT TEST [STATIC WATER]

| Active compound | Concentration of active compound in p.p.m. | Degree of damage after the following residence periods (3 weeks) | | |
|---|---|---|---|---|
| | | Elodea | Myrio-phyllum | Vallis-neria |
| (A) Cl—⟨C₆H₄⟩—SO₂NH—⟨C₆H₄⟩—CH₃ (known) | 5<br>2.5<br>1 | 3<br>2<br>1 | 3<br>2<br>1 | 3<br>3<br>1 |
| (B) Cl—⟨C₆H₄⟩—SO₂NH—⟨C₆H₄⟩—Cl (known) | 5<br>2.5<br>1 | 3<br>3<br>2 | 3<br>3<br>3 | 3<br>1<br>0 |
| (2₁) Cl—⟨C₆H₃(Cl)⟩—SO₂—NH—⟨C₆H₂(Cl)(Br)(Cl)⟩ | 5<br>2.5<br>1 | 5<br>5<br>4 | 5<br>5<br>5 | 5<br>5<br>3 |
| (3₁) Cl—⟨C₆H₃(Cl)⟩—SO₂NH—⟨C₆H₂(Cl)(Br)(Cl)⟩ | 5<br>2.5<br>1 | 5<br>5<br>5 | 5<br>5<br>5 | 5<br>5<br>5 |
| (1₂) Cl—⟨C₆H₃(Cl)⟩—SO₂—NH—⟨C₆H₂(Cl)(Cl)(Cl)⟩—Cl | 5<br>2.5<br>1 | 5<br>5<br>5 | 5<br>5<br>5 | 5<br>5<br>5 |

TABLE 1b.—AQUATIC PLANT TEST [STATIC WATER]

| Active compound | Concentration of active compound in p.p.m. | Degree of damage after the following residence periods (3 weeks) | | |
|---|---|---|---|---|
| | | Elodea | Myrio-phyllum | Vallis-neria |
| (A) Cl—⟨C₆H₄⟩—SO₂NH—⟨C₆H₄⟩—CH₃ (known) | 10 | 3 | 4 | 3 |
| (B) Cl—⟨C₆H₄⟩—SO₂NH—⟨C₆H₄⟩—Cl (known) | 10 | 3 | 4 | 4 |
| (2₂) Cl—⟨C₆H₃(Cl)⟩—SO₂—NH—⟨C₆H₂(Cl)(Br)(Cl)⟩ | 10 | 5 | 5 | 5 |
| (3₂) Cl—⟨C₆H₃(Cl)⟩—SO₂NH—⟨C₆H₂(Cl)(Br)(Cl)⟩ | 10 | 5 | 5 | 5 |

Example 2

Aquatic plant test [with change of water]
Solvent: 10 parts by weight acetone
Emulsifier: 2 parts by weight alkylaryl polyglycol ether To produce a suitable preparation of the particular active compound, 1 part by weight of such active compound is mixed with the stated amount of solvent, the stated amount of emulsifier is then added, and the resulting concentrate is thereafter diluted with water to the desired final concentration.

The dilute preparation of the given active compound is put in a vessel into which aquatic plants are subsequently placed. After a specified residence period in the aqueous preparation of the active compound, the aquatic plants are taken out and transferred to containers with tap water.

Three weeks after the transfer, the degree of damage to the aquatic plants is determined, using the following characteristic values:

0 no damage
1 a few leaves dying
2 one third of the plant dead
3 one half of the plant dead
4 plants dying, but still green
4.5 only a few green parts left
5 plant completely dead.

The particular active compounds tested, their concentrations, the aquatic plants, the residence period and the degree of damage can be seen from the following table 2:

TABLE 2.—AQUATIC PLANT TEST [WITH CHANGE OF WATER]

| Active compound | Concentration of active compound in p.p.m. | Degree of damage after the following residence periods | | | | | | | | |
|---|---|---|---|---|---|---|---|---|---|---|
| | | Elodea | | | Myriophyllum | | | Vallisneria | | |
| | | 8 hrs. | 4 hrs. | 2 hrs. | 8 hrs. | 4 hrs. | 2 hrs. | 8 hrs. | 4 hrs. | 2 hrs. |
| (2₃) Cl-⟨⟩(Cl)-SO₂-NH-⟨⟩(Cl,Br,Cl) | 50 | 5 | 5 | 5 | 5 | 5 | 5 | 5 | 5 | 5 |
| | 10 | 4 | 4 | 4 | 4 | 4 | 4 | 4 | 4 | 4 |
| | 5 | 4 | 4 | 4 | 4 | 4 | 4 | 4 | 4 | 4 |
| (3₃) Cl-⟨⟩(Cl)-SO₂-NH-⟨⟩(Cl,Br,Cl) | 50 | 5 | 5 | 5 | 5 | 5 | 5 | 5 | 5 | 5 |
| | 10 | 5 | 5 | 5 | 4 | 4 | 4 | 3 | 3 | 3 |
| | 5 | 5 | 5 | 5 | 4 | 4 | 4 | 3 | 3 | 3 |
| (1₃) Cl-⟨⟩(Cl)-SO₂-NH-⟨⟩(Cl,Cl,Cl,Cl) | 50 | 5 | 5 | 5 | 5 | 5 | 5 | 5 | 5 | 5 |
| | 10 | 5 | 5 | 5 | 5 | 5 | 5 | 5 | 5 | 4-5 |
| | 5 | 5 | 5 | 5 | 5 | 5 | 5 | 5 | 5 | 3 |

Example 3

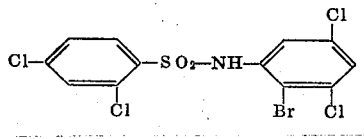

a. To a solution of 241 parts 2-bromo-3,5-dichloro-aniline in 700 parts pyridine there are added, at 20° C., 246 parts 2,4-dichloro-benzene-sulfonic acid chloride. The temperature first rises a little, then falls to room temperature. The mixture is stirred for a further 8 hours at room temperature, poured into water, and the separated oil is washed with dilute hydrochloric acid and then crystallized from alcohol. Recrystallized from alcohol, the 2'-bromo-2,3', 4, 5'-tetrachloro-benzene-sulfonic acid anilide, i.e. 2,4-dichloro-benzene-sulfonic acid (2'-bromo-3',5'-dichloro)-anilide, melts at 152° to 154° C.

b. The 2-bromo-3,5-dichloro-aniline is prepared as follows:

207 parts 2,4-dichloro-aniline are introduced at 20° C. into a mixture of 325 parts of (about 42 percent) nitrosyl-sulfonic acid and 340 parts of (about 98 percent) sulfuric acid. This solution is added dropwise at 25° to 30° C. to a mixture of 370 parts of 48 percent hydrobromic acid, 20 g. copper (I) bromide and 450 parts water. In order for the mixture to be more easily stirred, it is advantageous to add a further 300 parts of water. 2-bromo-3,5-dichloro-1-nitro-benzene is precipitated, with the evolution of nitrogen. Recrystallized from benzine, it melts at 56° to 58° C.

The 2-bromo-3,5-dichloro-1-nitro-benzene so obtained is dissolved in a suitable solvent, such as alcohol or dioxan, and reduced with hydrogen and a hydrogenation catalyst to give 2-bromo-3,5-dichloro-aniline. Recrystallized from alcohol, it melts at 84° C. The reduction can also be carried out with iron and dilute acids.

Example 4

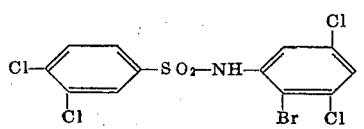

241 parts 2-bromo-3,5-dichloro-aniline and 246 parts 3,4-dichloro-benzene-sulfonic acid chloride are dissolved in 500 parts acetone, and 112 parts triethylamine are added dropwise at 0° C. Stirring is continued for 2 hours at 0° C., the cooling means is removed, and stirring is effected for 12 hours at room temperature. The partially crystallized mixture is washed with water and recrystallized from alcohol. The 2'-bromo-3,3'-4,5'-tetrachloro-benzene-sulfonic acid anilide, i.e. 3,4-dichloro-benzene sulfonic acid (2'-bromo-3', 5'-dichloro)-anilide, has a melting point of 143° C.

Example 5

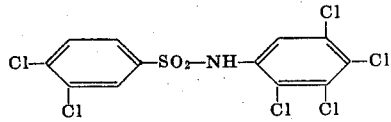

642 parts 2,3,4,5-tetrachloro-aniline and 245 parts 2,4-dichloro-benzene-sulfonic acid chloride are heated at 200° to 210° C. for 5 hours. The resulting dark mass is boiled with 2,000 parts of dilute solution of sodium hydroxide and filtered off from the excess 2,3,4,5-tetrachloro-aniline and charcoal is added to the filtrate, which is then filtered and cooled. The sodium salt of 2,2',3',4,4',5'-hexachloro-benzene-sulfonic acid anilide is precipitated. The sodium salt can be converted with dilute hydrochloric acid to give 2,2',3',4,4',5'-hexachloro-benzene-sulfonic acid anilide, i.e. 2,4-dichloro-benzene-sulfonic acid (2',3',4',5'-tetrachloro)-anilide, which, recrystallized from alcohol, melts at 136° to 138° C.

Example 6

The following compounds are prepared in analogous manner:

3,4-dichloro-benzene-sulfonic acid (2',3',4',5'-tetrachloro)-anilide (1₄);
3,4-dichloro-benzene-sulfonic acid (2',3',5'-trichloro)-anilide (5₁)
2,4-dichloro-benzene-sulfonic acid (2',3',5'-trichloro)-anilide (6₁)
3,4-dichloro-benzene-sulfonic acid (2'-bromo-3',4',5'-trichloro)-anilide (7₁); and
2,4-dichloro-benzene-sulfonic acid (2'-bromo-3',4',5'-trichloro)-anilide (8₁)

It will be realized by the artisan that all of the foregoing compounds contemplated by the present invention possess the desired strong and selective herbicidal properties, and especially the capability of controlling and destroying selectively submersed aquatic plants or weeds, as well as a comparatively low toxicity toward warmblooded creatures, enabling such compounds to be used with correspondingly favorable compatibility with warmblooded creatures for more effective control and/or elimination of submersed aquatic plants or weeds by application of such compounds to such plants or weeds and/or their aquatic habitat. As contemplated herein, the term "weeds" is meant to include not only weeds in the narrow sense, but also weeds, and especially submersed aquatic plants, in the broad sense, whereby to cover all submersed aquatic plants and vegetation considered undesirable for the particular purposes in question.

It will be appreciated that the instant specification and examples are set forth by way of illustration and not limitation, and that various modifications and changes may be made without departing from the spirit and scope of the present invention.

What is claimed is:

1. A polyhalo-(sulfonic acid anilide) of the formula:

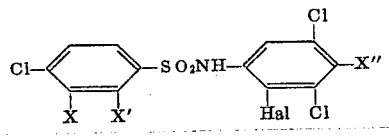

wherein X is chloro, X' is hydrogen, X'' is chloro and Hal is bromo.

2. A polyhalo-(sulfonic acid anilide) of the formula:

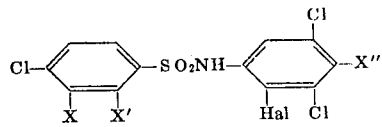

wherein X is hydrogen, X' is chloro, X'' is chloro and Hal is bromo.

3. The compound 2,4-dichloro-benzene-sulfonic acid (2'-bromo-3',5'-dichloro)-anilide of the formula:

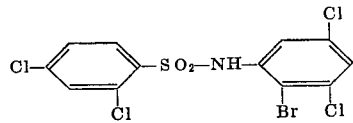

4. The compound 3,4-dichloro-benzene sulfonic acid (2'-bromo-3',5'-dichloro) anilide of the formula:

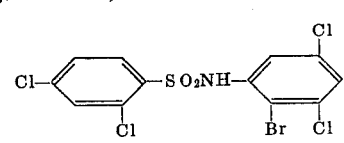

* * * * *

PO-1050
(5/69)

UNITED STATES PATENT OFFICE
CERTIFICATE OF CORRECTION

Patent No. 3,624,150                     Dated   November 30, 1971

Inventor(s)  Johann Albrecht Renner, Ludwig Eue, Helmuth Hack

It is certified that error appears in the above-identified patent and that said Letters Patent are hereby corrected as shown below:

Col. 4, line 7

"vincinal" should be   --vicinal--

Col. 4, line 26

"very"  should be   --vary--

Cols. 5/6, Tables 1a, 1b, and Table 2

Heading of last column:
      "Vallisneria" should be   --Vallisner--

Col. 7, line 48

After "dichloro" insert   --6-nitro-  --

Signed and sealed this 16th day of May 1972.

(SEAL)
Attest:

EDWARD M. FLETCHER, JR.                ROBERT GOTTSCHALK
Attesting Officer                       Commissioner of Patents